No. 847,835. PATENTED MAR. 19, 1907.
J. B. SECOR.
TYPE WRITING MACHINE.
APPLICATION FILED AUG. 7, 1903.
6 SHEETS—SHEET 1.
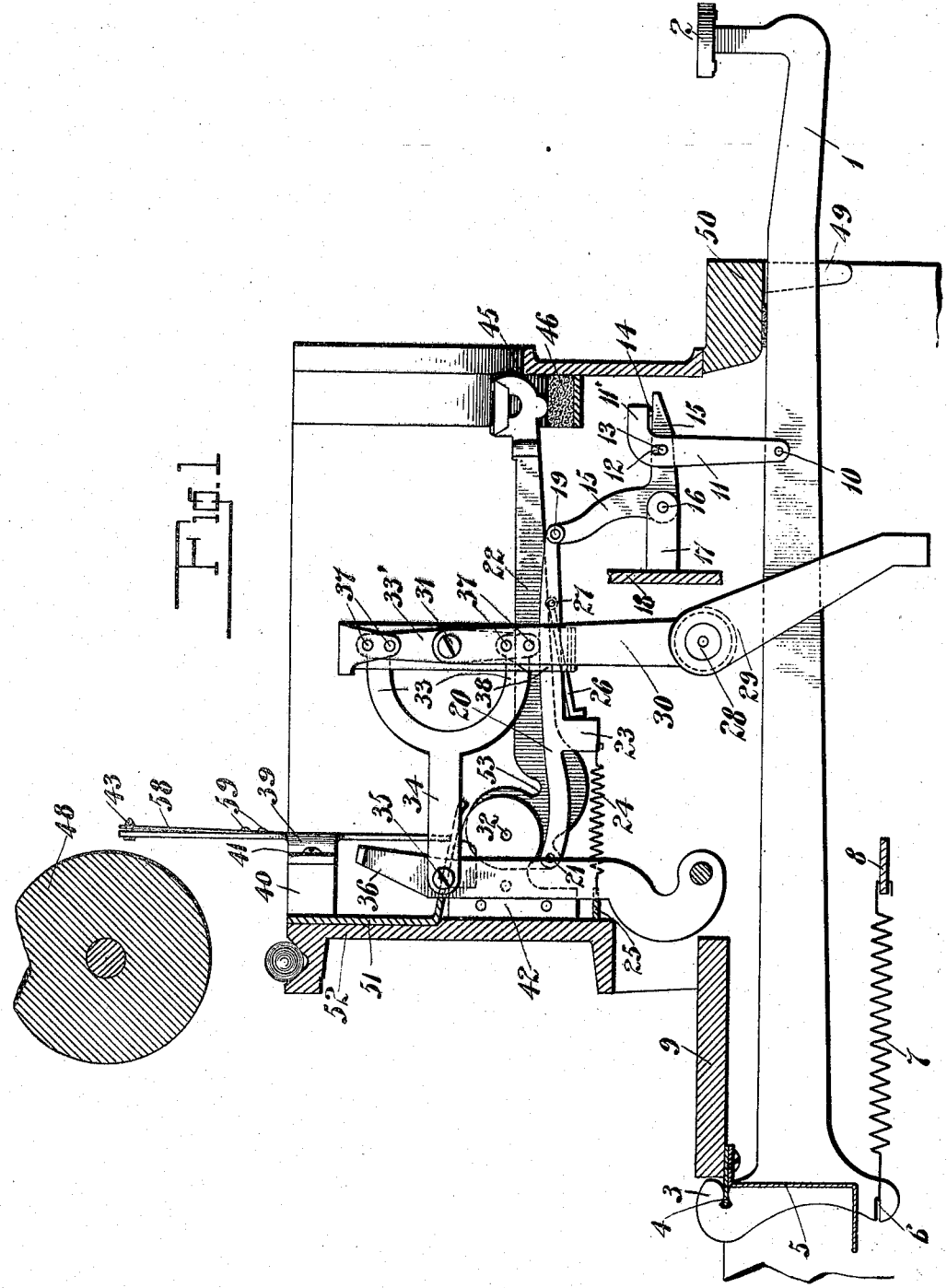

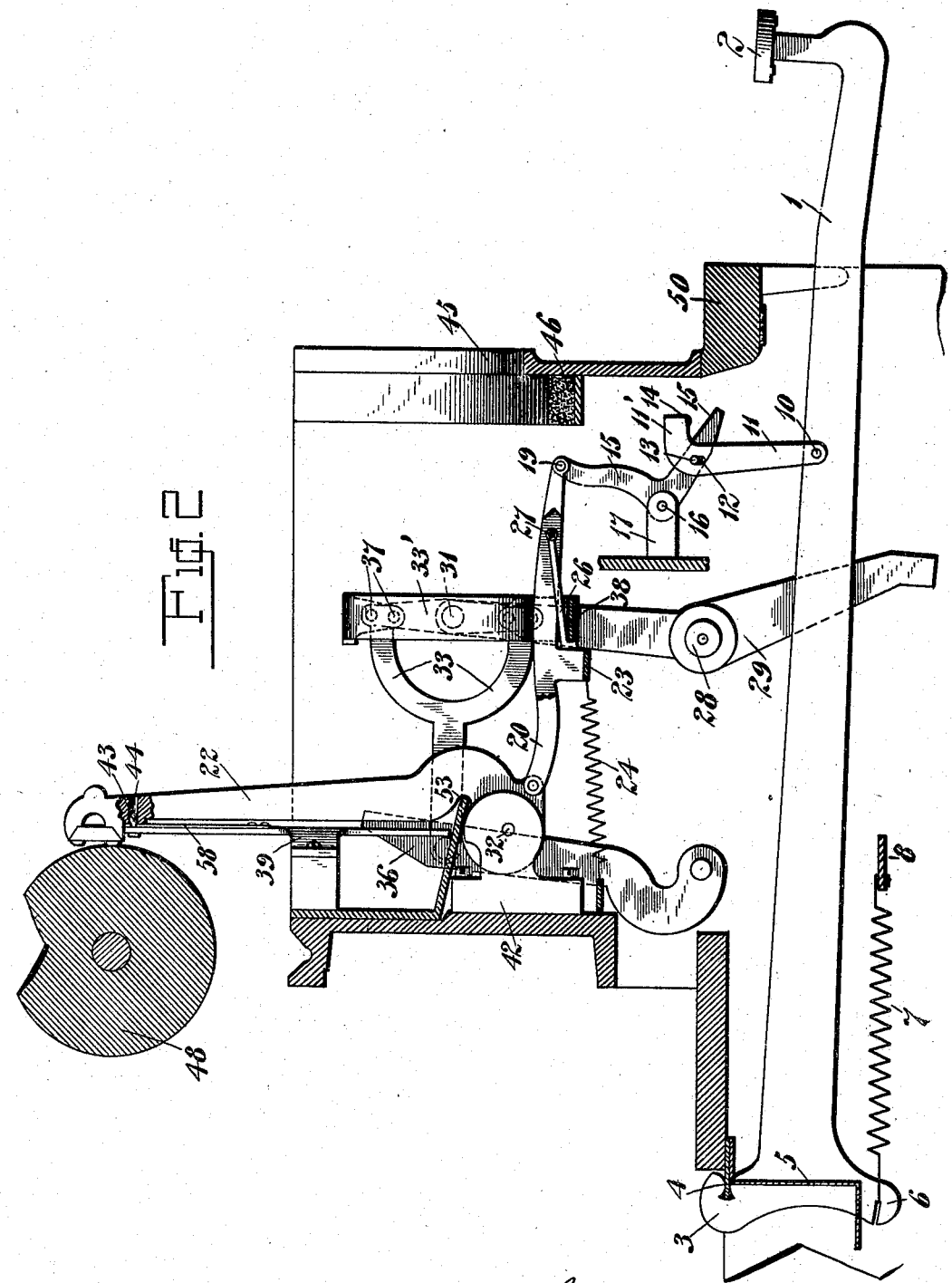

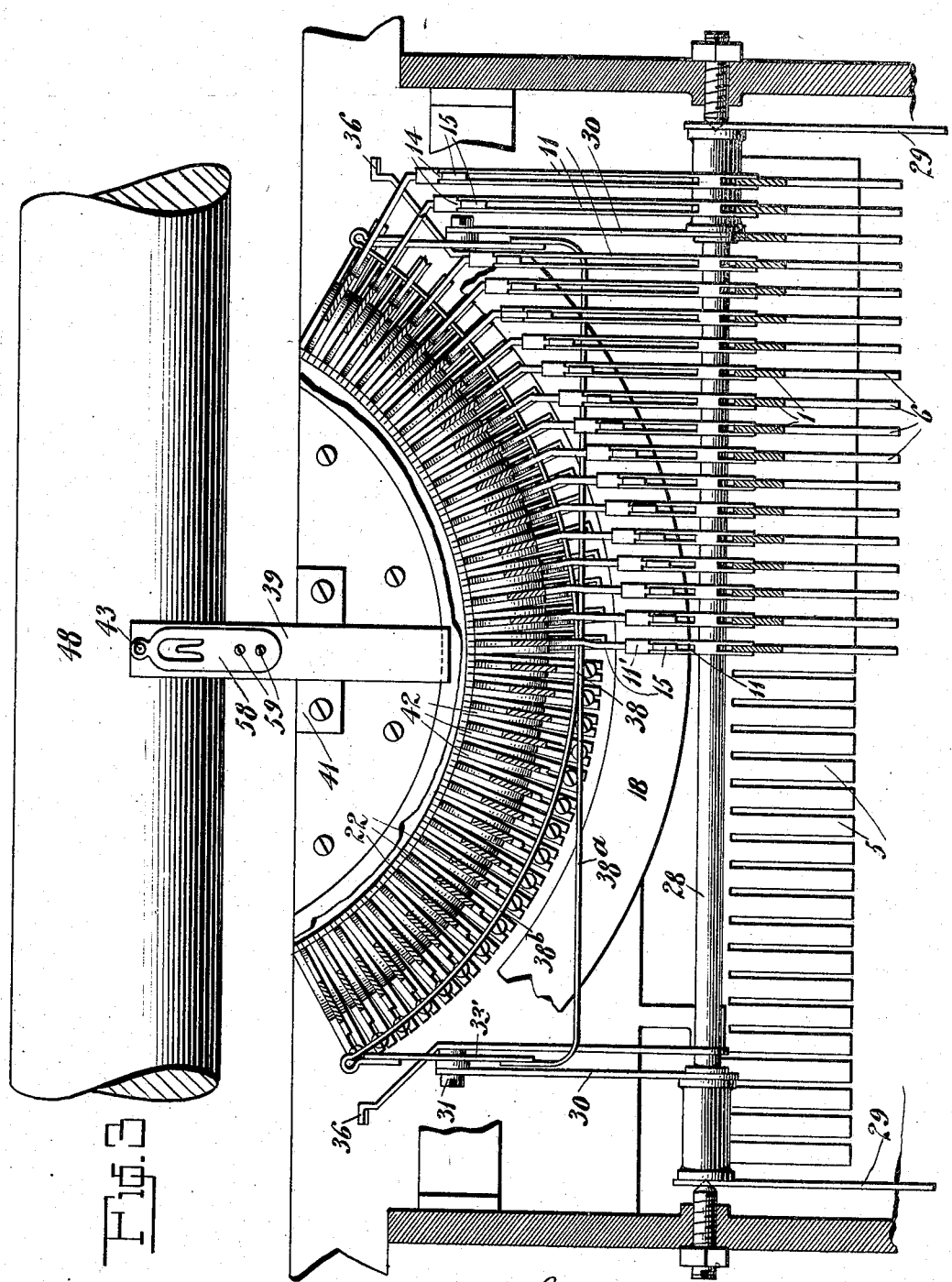

No. 847,835. PATENTED MAR. 19, 1907.
J. B. SECOR.
TYPE WRITING MACHINE.
APPLICATION FILED AUG. 7, 1903.
6 SHEETS—SHEET 4.
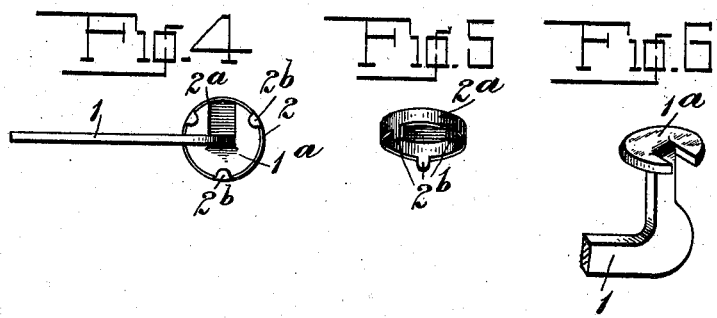
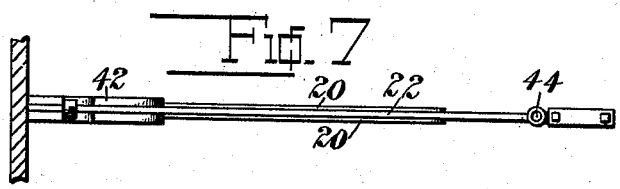
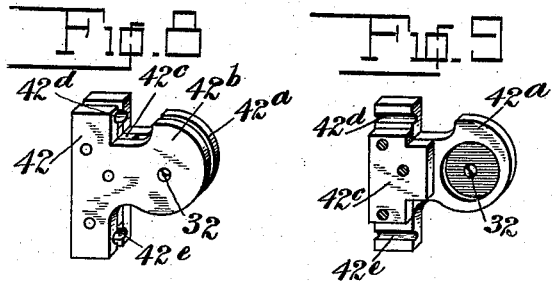
Witnesses
J. J. Liner
Harry J. Knight
Jerome B. Secor
Inventor
By his Attorneys No. 847,835. PATENTED MAR. 19, 1907.
J. B. SECOR.
TYPE WRITING MACHINE.
APPLICATION FILED AUG. 7, 1903.
6 SHEETS—SHEET 6.
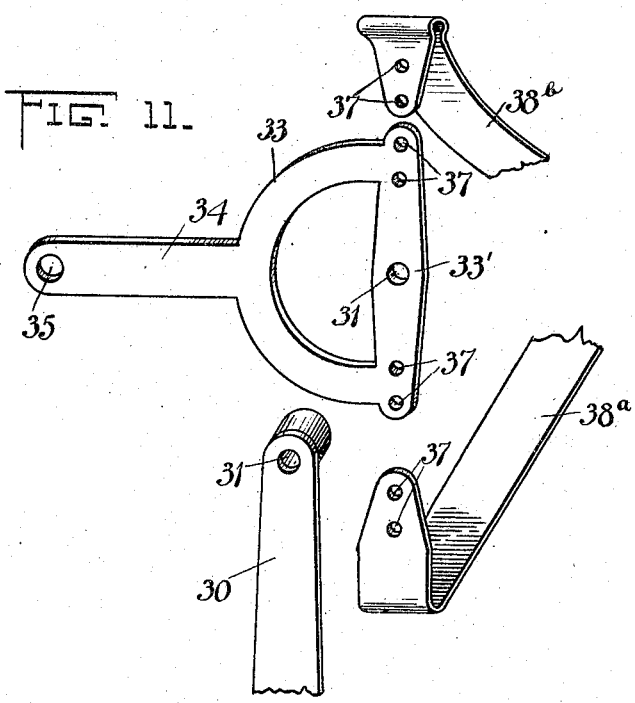
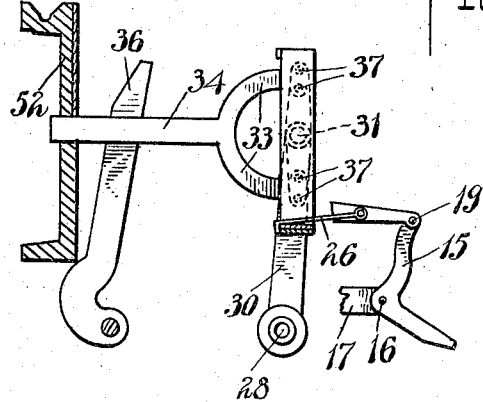

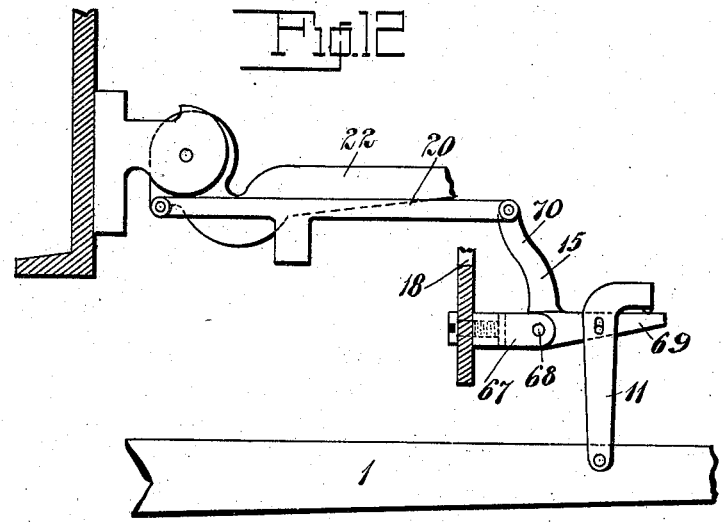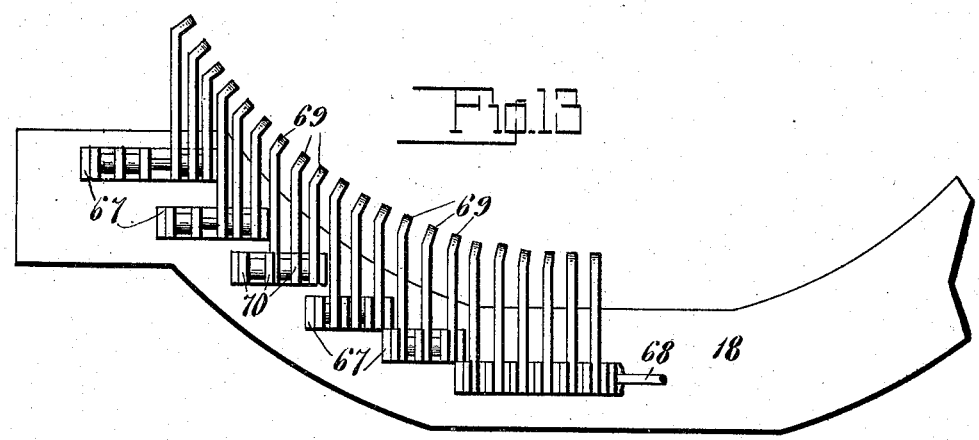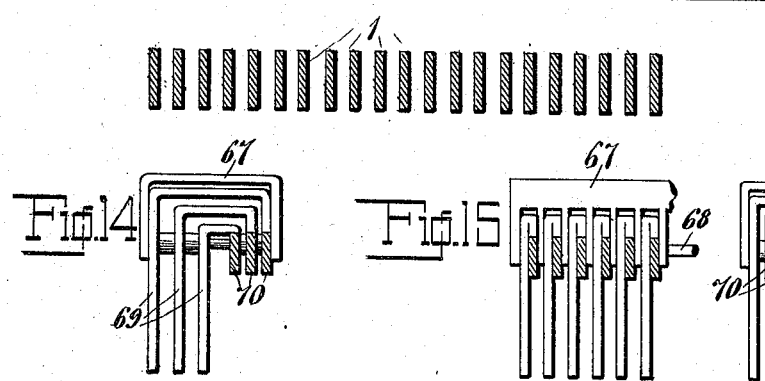

UNITED STATES PATENT OFFICE.

JEROME B. SECOR, OF DERBY, CONNECTICUT, ASSIGNOR TO THE WILLIAMS TYPEWRITER COMPANY, OF DERBY, CONNECTICUT, A CORPORATION OF IOWA.

TYPE-WRITING MACHINE.

No. 847,835.

Specification of Letters Patent.

Patented March 19, 1907.

Application filed August 7, 1903. Serial No. 168,600.

*To all whom it may concern:*

Be it known that I, JEROME B. SECOR, a citizen of the United States, residing at Derby, in the county of New Haven and State of Connecticut, have invented certain new and useful Improvements in Type-Writing Machines, of which the following is a specification.

My invention relates to certain improvements in that class of type-writing machines known as "front-strike" machines.

The novel construction particularly relates to the key action and type-bar-actuating mechanism, in which the operation of the type-bar is accelerated and in which an even and easy touch on the keys is provided.

My invention further embodies a novel construction of the type-bar mountings and certain other parts, all of which will be more fully described and set forth in the specification and claims.

Only so much of the structure of a typewriting machine as is necessary to illustrate my invention is illustrated in the drawings, in which—

Figure 1 is a sectional side elevation of a machine embodying my invention, showing the improved type-bar-actuating mechanism, all parts in normal position. Fig. 2 is a similar view showing the parts in operated positions. Fig. 3 is a sectional front elevation of portions of the machine, illustrating particularly the arrangement of the bell-crank levers, the type-bar-actuating links, the type-bar hangers, and the universal bar. Figs. 4, 5, and 6 show novel construction of finger-keys. Fig. 7 is a detail top plan view of a type-bar in the position of rest, showing the bridge of the machine in section. Figs. 8 and 9 are respectively a detail perspective and a detail perspective with one of the side plates removed of the improved type-bar bracket or pivot. Fig. 10 shows a bottom plan view of the paired links connecting the key-bar mechanism with type-bar. Fig. 11 is a detail perspective view of a portion of the universal bar with one of its guiding-yokes, showing the parts separated for sake of clearness. Fig. 11ª is a transverse section through the machine, showing a modified form of mounting for the universal-bar-guiding yokes. Fig. 12 is a partial side elevation of the improved type-bar-actuating mechanism with the typehead, platen, key-button, and other parts of the machine removed. Fig. 13 is a front elevation of a series of sublevers forming a part of the improved type-bar-actuating mechanism and the plate upon which the same are mounted, showing the key-bars in section beneath said plate. Fig. 14 is a detail plan view, partly in section, showing one of the sublever-brackets, the vertical arms of the sublevers therein being shown in section. Figs. 15 and 16 show slight modifications of the same.

1 is a key-bar having at its forward end the finger-key 2 and provided at its rear upper end with a rounded jaw 3, designed to fulcrum or pivot upon a plate or bar 4, which is rigidly fixed to a stationary part 9 of the machine-frame. The key-bar 1 is prevented from lateral movement by two sets of combteeth guides 5 and 49, which form vertical slots at the rear and front ends of the keybar. Comb-teeth 5 are attached to stationary support 9, and comb-teeth 49 are fixed to part 50 of the machine-frame. There is also provided at the rear end of key-bar 1 a downward extension or arm 6, to which is attached a spring 7 for maintaining the forward end of the key bar in its normally-elevated position, the spring 7 of the several key-bars being fixed to stationary bar 8, extending across the machine.

Pivoted to key-bar 1 at 10 is a link 11, furnished with a slot 12 for a pin 13, fixed upon the forward-extending arm of bellcrank lever 15, which is journaled at 16 to the arm or bracket 17, rigidly fixed upon stationary part 18 of the frame. Bell-crank lever 15 is to operate the type-bar in the manner described later. The link 11 is composed of two side pieces or members united at the end of forward extension 11', on the under side of which is a rounded nose 14, and as the link 11 straddles the forward arm of lever 15 the nose 14 normally rests upon the upper surface of said forward arm. It is obvious that as the pin 13 is normally at the bottom of the slot 12 the first motion of the key-bar in its depression will be communicated to bell-crank lever 15 through the nose 14, which being further from pivot 16 than the pin 13 will have greater leverage and require less force to start the type-bar mechanism under way, thus lightening the touch. When the bell-crank lever 15 has been turned to the point where pin 13 abuts against the top of slot 12, the nose 14 will leave the surface of lever 15 and the remainder of the stroke will be communicated through pin 13. Thus the action of the type-bar will be accelerated and be even throughout the stroke of the key-bar. In intermediate positions between these two extremes both the pin 13 and the forward extension 11' will be in operative engagement with their opposing parts.

Pivoted at 19 to the upper arm of each lever 15 is a pair of rearwardly-extending links 20, which connect the upper arm of the bell-crank lever 15 with the heels of the type-bars 22, the heels of the type-bars being pivoted between the links 20 at 21. The heel of the type-bar 22 is pivoted at 32 in a bracket or hanger 42. Hanger 42 is formed (see Figs. 8 and 9) in three pieces—cheeks $42^a$ and $42^b$, which form the sides of the hanger, and separator $42^c$, which serves to separate cheeks $42^a$ and $42^b$. Said cheeks are provided with circular recesses which may be used for oilcups, but are primarily to reduce to a minimum the friction between the cheeks $42^a$ $42^b$ and the type-bars 22, so that said cheeks may be made of maximum size to insure against lateral vibration of the type-bars.

$42^d$ and $42^e$ are screw-holes for the screws which fasten the hanger to its stationary support 52.

The links 20 are connected by a rigid downwardly-extending U-shaped link 23, to which is attached a spring 24. This spring 24 being fastened to rigid support 25 operates to accelerate the return of the type-bar 22, through means of links 20, to normal position. Between links 20 is pivoted at 27 a hooked arm 26, the other end of the hooked arm being free. The purpose of the hooked arm 26 will be described later.

A vertical arm 39, Figs. 1, 2, and 3, fixed to a support 40 by screws 41, carries at its upper end a conoidal pin 43 to enter a hole 44 in the respective type-bars 22 as each reaches the common printing-point. This alining device I have made the subject of a separate application, Serial No. 178,810, filed the 28th of October, 1903. A rock-shaft 28 extends transverse of the machine and has mounted at the ends thereof downwardly-extending arms 29 for actuating the ribbon-winding mechanism. (Not shown.)

To the upper end of each arm 30 is pivoted a vertical bar 33', which connects the curved arms 33 of a yoke having a horizontal arm 34. Arm 34 is pivotally mounted on a vertical rock-arm 36, Figs. 1, 2, and 3. Rock-arms 36, besides forming supports for arms 34 of the yokes, form a part of the line-lock mechanism, (not shown,) which does not concern the present invention. If it is desired, the ends of arms 34 may pass through suitable perforations 60 in the bridge 52, Fig. $11^a$. The function of the arms 36 and perforations in the bridge 52 is to support the arms 34 on a horizontal. Attached to the forward part 33' of yoke 33, Fig. $11^a$, are the ends of a universal bar 38, which bar is made in the form of a frame, as shown in Fig. 3, with lower horizontal or bracing member $38^a$ and upper engaging member $38^b$, curved to avoid and lie just under the type-bars and their operating-links. This universal bar lies in a vertical plane extending under the paired links 20, which connect the bell-crank levers 15 with heels 21 of type-bars 22, so that near the end of the forward movement of links 20 the universal bar is engaged by hook-arm 26 and carried forward in a horizontal path, thus operating the carriage-escapement and the ribbon-feed. The arrangement just described, comprising the yoke 33 33', the pivots 31, vertical arms 30, and frame-shaped universal bar, is especially intended to insure a parallel movement of the universal bar.

Another feature of my invention is a dust-guard plate, (shown at 51 in Fig. 1.) This dust-guard is formed like a section of a round flaring flat-bottomed pan, the bottom being fastened by screws to the support 52, so that the curved rim conforms to and covers the type-bar brackets, shielding them from dust and dirt, especially that from erasures and from cleaning the type. When the type-bar is vertical, the guard fits into the recess 53.

The keys in my improved construction are made as shown in Figs. 4, 5, and 6 of the drawings. The key-bar 1 is made of sheet metal, with the end finishing in a circular plate $1^a$ bent at a right angle and adapted to receive a cap $2^a$, which has the lips $2^b$ for clamping or fastening over the letter or character.

Attached to the face of type-guide 39 is a spring 58. This spring is secured by screws 59 to said type-guide, the upper end being free, so that when a type comes up to make its impression the spring is forced in, and by its tension it at once forces the type-bar 3 outward, thus disengaging the alining pin from the hole in the type-bar and helping to return said type-bar to its normal position.

In Figs. 12 to 16, inclusive, I have shown slight modification in the form of mounting of the bell-cranks 15, wherein it is possible to so change a pair of type-bars as to separate the same without changing the keyboard of the machine. Such change is accomplished through the provision of a series of U-shaped plates 67, secured to the stationary part 18 by screws, so that the same are easily removable. Plates 67 carry suitable bearing-pins 68 and are arranged, as shown in Fig. 13, one above another in an arc on the stationary part 18. In such modified structure I have constructed the bell-cranks, as shown at 69, with their rear ends bent angularly to straddle the bent ends of the adjacent bell-cranks, so that while the forward end of a bell-crank 69 may be over its operating-lever 1 the rear end carrying the upper arm 70 of said bell-crank, to which the link 20 is at its outer end pivoted, may be in any desirable location in its plate 67 to bring it under the type-bar which it is desired it shall operate. It will readily be seen that in this manner the location of a type-bar may be changed to a different position in the type-segment without necessitating the changing of the location of the keys in the keyboard. Such an arrangement is of great value when it is desired to separate one letter from another to prevent interlocking of their respective levers in operation.

Having thus described my invention, the following is what I claim as new therein and desire to secure by Letters Patent—

1. In a type-writing machine the combination of a key-bar having at its heel or fulcrum end, an upwardly and horizontally projecting jaw or lug 3 with a convex bottom surface forming a rocking bearing, and a bearing-plate 4 projecting horizontally beneath said lug 3, substantially as shown and described.

2. In a type-writing machine a key-bar having at its heel or fulcrum end an upwardly and horizontally projecting bearing lug 3 and a downward projection 6; in combination with a plate 4 projecting horizontally beneath the lug 3 to form a bearing therefor, a support 9 to which the plate 4 is attached forming a shoulder against which the lug 3 rests, and a spring 7, connected to the downward projection 6, tending to restore the key-bar to normal position when depressed and to draw the bearing-lug 3 horizontally against the support 9, substantially as set forth.

3. The combination of the key-bar 1 having at its heel or fulcrum end an upwardly and horizontally projecting bearing-lug 3 and a downward projection 6; the bearing-plate 4 on which the lug 3 rocks, the support 9 forming a vertical shoulder against which said lug rests, the spring 7 tending to restore the key to normal position and to press the lug 3 horizontally against the support 9 and the comb-plate 5 to retain the assembled key-bars against lateral movement, substantially as set forth.

4. In a type-writing machine the combination of a key-bar, a bell-crank lever and an L-shaped link formed of two leaves straddling the bell-crank lever and bearing thereon by its horizontal upper end and articulated by its lower end to the key-bar so as to be actuated thereby, substantially as set forth.

5. The combination of the key-bar 1, bell-crank lever 15, link 11 articulated by its lower end to the key-bar and having a forward extension 11$^a$ bearing on the horizontal arm of the bell-crank near its forward end, and a slot-and-pin connection 12, 13 whereby after the first depression of said lever-arm it is depressed with an accelerated movement.

6. In a type-writing machine, the combination of a key-bar, a bell-crank lever, a link connecting said key-bar with said bell-crank lever and straddling said lever, with means of varying the point of application of power, substantially as set forth.

7. In a type-writing machine the combination of a key-bar, a type-bar, a bell-crank lever a link connecting the type-bar and the bell-crank lever, and a link connecting the key-bar and the bell-crank lever, the link connecting the key-bar and bell-crank lever being made to bear near the outer end of the bell-crank lever on the first depression of the key-bar, and in the latter part of its depression to act on said bell-crank lever at a point nearer its fulcrum, substantially as and for the purpose set forth.

8. The combination of the key-bar, bell-crank lever, link articulated by its lower end to the key-bar and having a forward extension the extreme end of which is unconnected with but is adapted to bear on the upper face of the horizontal arm of the bell-crank near its forward end, and a slot-and-pin connection whereby after the first depression of said lever-arm it is depressed with an accelerated movement.

9. In a writing-machine, the combination with a key-bar and a type-bar, of a sublever connected to said type-bar and a link connecting said key-bar with said sublever, straddling said sublever and varying in its point of application of power thereto.

10. In a writing-machine, the combination with a type-bar, of a pivot for supporting said type-bar and a type-bar bracket formed with two cheek-plates supporting said pivot, embracing the heel of the type-bar, and formed on their inner faces with circular recesses about said pivot, and annular flat bearing-surfaces surrounding said recesses and arranged in the plane of movement of the type-bar.

11. In a writing-machine, the combination with a type-bar, of a pivot supporting said type-bar, and a bracket comprising a separating-plate and extended cheek-plates for supporting said pivot formed with circular recesses surrounding said pivot and flat annular bearing-surfaces surrounding said recesses and arranged in the plane of movement of the type-bar.

12. The combination with the type-bar and the universal bar positioned beneath said type-bar intermediate its ends, when in normal position, of the link connected to the heel of said type-bar and extending toward the free end thereof, a hooked bar pivoted to the said link and adapted to engage with the universal bar near the end of the active movement of the said link.

13. The combination with the type-bar and the universal bar located beneath the type-bar intermediate its ends, when in normal position, of a link comprised of two leaves pivoted to the heel of the said type-bar, straddling said type-bar and extending toward its free end, and a hook pivoted between the said leaves and engaging the universal bar near the end of the active movement of the said link.

14. In a type-writing machine, the combination with the type-bars and their operating-links, of a universal bar comprising a lower horizontal member and an upper member curved to avoid the type-bars and their operating-links, and means carried by said links for engaging the upper member of said universal bar.

15. In a type-writing machine, the combination with the type-bars and their operating-links, of a rock-shaft, upwardly-extending arms on said rock-shaft, of yokes having rearwardly-extending horizontal arms and curved forward arms integral vertical arms pivoted to the upwardly-extending arms on said rock-shaft, of a universal bar connected at its ends to the forward parts of the said yokes and comprising a lower horizontal member and a curved upper member, and means carried by the type-bar-operating links for engaging the upper member of said universal bar.

16. In a writing-machine the combination with a type-bar and a guiding-link, of a universal bar comprising a curved upper engaging member disposed beneath said type-bar and actuating-link, and a lower horizontal bracing member, means carried by the actuating-link for engaging said curved member, guiding-yokes secured to each end of the two members of said universal bar, pivoted supports at the forward ends of said guiding-yokes and means for supporting said guiding-yokes at their rear ends.

17. In a writing-machine, the combination with a plurality of type-bars and a plurality of key-bars, of a series of plates, and a plurality of levers mounted in each of said plates and connected to said type-bars and key-bars, certain of said levers being bent at their ends to overlap the ends of adjacent levers.

18. In a type-writing machine, the combination with a pivoted "front-strike" type-bar mounted to lie in an approximately horizontal plane when at rest, of a forwardly-extending horizontal link formed of two members pivoted to opposite sides of the heel of the type-bar and receiving the type-bar between the members when in a position of rest, and a spring connected at one end to the link and at the other end to the frame of the machine.

19. In a type-writing machine, the combination with the pivoted "front-strike" type-bars, the pivoted key-levers arranged below the type-bars, and the horizontal links pivoted to the heels of the type-bars, of a universal bar operated by the links and located between the type-bars and the key-levers and between the ends of the links.

20. In a type-writing machine, the combination with the type-bars and the key-levers, of a plurality of independent bearing-plates arranged in various horizontal planes, and a plurality of bell-crank levers mounted on each bearing-plate, and forming a connection between the type-bars and the key-levers, some of the bell-crank levers on each bearing-plate overlapping other bell-crank levers on the same bearing-plate.

21. In a type-writing machine, the combination with the type-bars and the key-levers, of a plurality of shafts located in various horizontal planes, and a plurality of bell-crank levers journaled on each shaft and connecting the type-bars and the key-levers, some of said bell-crank levers on each shaft overlapping other of the bell-crank levers on the same shaft.

22. In a type-writing machine, the combination with the key-levers and the type-bars, of bell-crank levers connecting the key-levers and the type-bars, said bell-crank levers being divided into groups turning about various axes, some of the bell-cranks of each group overlapping other members of the same group.

23. In a type-writing machine, the combination of a type-bar, a key-bar, an actuating-link interposed between said type and key bars, said key-bar operating through said actuating-link to effect the printing stroke of said type-bar and a spring connected to said actuating-link for returning said type-bar upon the completion of said printing stroke, said type-bar, actuating-link and spring lying in substantially a horizontal plane when said type-bar is in its normal nested position.

JEROME B. SECOR.

Witnesses:
 JAMES P. CLARKE,
 C. E. BEARDSLEY.